(12) United States Patent
Tanaka

(10) Patent No.: US 9,063,400 B2
(45) Date of Patent: Jun. 23, 2015

(54) PROJECTOR LIGHT SOURCE HAVING THREE COOLING AIRFLOW DELIVERY PORTS

(75) Inventor: Katsunori Tanaka, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 247 days.

(21) Appl. No.: 13/526,622

(22) Filed: Jun. 19, 2012

(65) Prior Publication Data

US 2013/0010267 A1 Jan. 10, 2013

(30) Foreign Application Priority Data

Jul. 4, 2011 (JP) ................................ 2011-148007

(51) Int. Cl.
| | |
|---|---|
| *G03B 21/20* | (2006.01) |
| *G03B 21/16* | (2006.01) |
| *H01J 61/52* | (2006.01) |
| *H04N 9/31* | (2006.01) |
| *F21V 29/02* | (2006.01) |
| *F21V 29/00* | (2015.01) |
| *G03B 21/14* | (2006.01) |

(52) U.S. Cl.
CPC .............. *G03B 21/16* (2013.01); *H04N 9/3144* (2013.01); *H01J 61/523* (2013.01); *F21V 29/02* (2013.01); *F21V 29/20* (2013.01); *F21V 29/40* (2013.01); *G03B 21/145* (2013.01); *G03B 21/2026* (2013.01)

(58) Field of Classification Search
CPC ...... G03B 21/16; G03B 21/145; G03B 21/20; G03B 21/2026; H04N 9/31; H04N 9/3141; H04N 9/3144; H04N 9/3197; F21V 7/20; F21V 29/02; F21V 29/025; F21V 29/027; F21V 29/20; F21V 29/40; H01J 61/52; H01J 61/523; H01J 61/526

USPC .......... 353/52, 57–58, 60–61; 362/218, 264, 362/294, 345, 373

See application file for complete search history.

(56) References Cited

U.S. PATENT DOCUMENTS

| | | | |
|---|---|---|---|
| 6,575,599 B1 | 6/2003 | Imamura et al. | |
| 6,976,760 B2 * | 12/2005 | Ito et al. ......................... | 353/61 |
| 7,210,825 B2 * | 5/2007 | Watanabe et al. ............. | 362/373 |
| 7,481,540 B2 * | 1/2009 | Morimoto et al. .............. | 353/57 |
| 7,922,335 B2 * | 4/2011 | Sakai et al. ..................... | 353/58 |
| 7,934,839 B2 * | 5/2011 | Noda ............................... | 353/61 |
| 8,408,714 B2 * | 4/2013 | Onodera et al. ................ | 353/61 |

(Continued)

FOREIGN PATENT DOCUMENTS

| | | |
|---|---|---|
| CN | 100385607 C | 4/2008 |
| JP | 2005-10505 A | 1/2005 |

(Continued)

*Primary Examiner* — Jori S Reilly-Diakun

(74) *Attorney, Agent, or Firm* — ALG Intellectual Property, LLC

(57) ABSTRACT

A light source device includes a reflector that reflects light received from an arc tube toward an illumination receiving area, and a housing that houses the reflector to form a space through which cooling air for cooling the arc tube flows. The housing has three delivery ports disposed side by side as ports from each of which the cooling air is delivered into the space. A first delivery port included in the three delivery ports is located such that the center of the first delivery port is disposed substantially at a position aligned with the optical axis of the arc tube. Second and third delivery ports included in the three delivery ports are disposed in the vicinity of one and the other sides of the first delivery port, respectively, with respect to the optical axis.

15 Claims, 8 Drawing Sheets

(56) References Cited

U.S. PATENT DOCUMENTS

| | | | |
|---|---|---|---|
| 8,474,983 B2* | 7/2013 | Jougo | 353/61 |
| 8,596,797 B2* | 12/2013 | Onodera et al. | 353/61 |
| 2005/0264766 A1* | 12/2005 | Morimoto et al. | 353/61 |
| 2006/0001340 A1 | 1/2006 | Pollmann-Retsch et al. | |
| 2007/0146645 A1* | 6/2007 | Lin et al. | 353/58 |
| 2010/0026966 A1 | 2/2010 | Nakano | |
| 2010/0103382 A1 | 4/2010 | Onodera et al. | |
| 2011/0075110 A1* | 3/2011 | Liang et al. | 353/58 |
| 2011/0216285 A1 | 9/2011 | Saito et al. | |
| 2011/0234987 A1 | 9/2011 | Tanaka et al. | |
| 2011/0299046 A1* | 12/2011 | Maehara et al. | 353/61 |

FOREIGN PATENT DOCUMENTS

| | | |
|---|---|---|
| JP | 2005-275301 A | 10/2005 |
| JP | 2010-38976 A | 2/2010 |
| JP | 2010-107574 A | 5/2010 |
| JP | 2010-212186 A | 9/2010 |
| JP | 2011-181431 A | 9/2011 |
| JP | 2011-221482 A | 11/2011 |
| TW | 424256 B | 3/2001 |

* cited by examiner

PROJECTOR LIGHT SOURCE HAVING THREE COOLING AIRFLOW DELIVERY PORTS

CROSS-REFERENCE

The entire disclosure of Japanese Patent Application No. 2011-148007 filed Jul. 4, 2011 is expressly incorporated herein.

BACKGROUND

1. Technical Field

The present invention relates to a light source device and a projector.

2. Related Art

A projector known in the art includes a light source device, a light modulation device which modulates light emitted from the light source device to form image light corresponding to image information, and a projection lens which enlarges and projects the image light thus formed onto a screen or the like. A typical light source device included in this projector contains a discharge-type arc tube such as an extra-high pressure mercury lamp. According to this type of light source device, the temperature of the arc tube increases during light emission.

In this case, the temperature of the upper part of the arc tube easily rises, causing whitening of this part after continuation of the high temperature condition. On the other hand, an excessive low temperature of the lower part of the light emission portion causes blackening of the lower part. In either of these cases, the arc tube may lose its transparency. Therefore, sufficient cooling is required for the upper part of the arc tube to such an extent as not to excessively reduce the temperature of the lower part of the arc tube.

JP-A-2010-212186 discloses a technology which includes a housing accommodating an arc tube and a main reflection mirror. The housing has a hollow column-shaped body disposed on the front side of the main reflection mirror in the light emission direction in such a position as to surround the arc tube, and a duct member disposed on the outside surface of the column-shaped body as an air passage through which air flows in the circumferential direction of the column-shaped body. The top surface of the column-shaped body has an upper introduction port through which the air coming from the duct member goes into the column-shaped body. The upper introduction port is disposed in such a location that the center of the upper introduction port lies at a position shifted from the center axis of the arc tube toward the upstream side with respect to the flow direction of the air within the duct member when the column-shaped body is viewed from above. According to this structure, the flow passage of the duct member becomes shorter, and the resistance of the air flowing through the duct member decreases. Therefore, air having a sufficient flow speed and a sufficient flow amount can be securely introduced through the upper introduction port and supplied to the light emission portion.

According to the technology disclosed in JP-A-2010-212186, the arc tube is cooled by using air supplied only through the one upper introduction port. However, the recent improvement over the light emission efficiency of the arc tube (light emission portion) requires such a structure of the light source device which cools the arc tube with still higher efficiency. Therefore, development of a light source device and a projector capable of cooling the arc tube with excellent efficiency has been demanded.

SUMMARY

An advantage of some aspects of the invention is to solve at least a part of the aforementioned problems and the invention can be implemented as the following application examples.

A light source device according to an application example of the invention includes: an arc tube that has a light emission portion for emitting light; a reflector that reflects the light toward an illumination receiving area with the arc tube fixed to the reflector; and a housing that houses the reflector to form a space through which cooling air for cooling the arc tube flows. The housing has three delivery ports disposed side by side as ports from each of which the cooling air is delivered into the space. A first delivery port included in the three delivery ports is located such that the center of the first delivery port is disposed substantially at a position aligned with the optical axis of the arc tube as viewed in the vertical direction. Second and third delivery ports included in the three delivery ports are disposed in the vicinity of one and the other sides of the first delivery port, respectively, with respect to the optical axis as viewed in the vertical direction.

According to the light source device having this structure, the cooling air delivered from the first delivery port located such that the center of the first delivery port is disposed substantially at a position aligned with the optical axis of the arc tube is sandwiched between the cooling airs delivered from the second and third delivery ports disposed on the sides while flowing, in which condition the delivery direction (flow direction) of the cooling air can be kept constant. In this case, the cooling air can be appropriately supplied to the upper part of the arc tube only by the arrangement of the first delivery port such that the center of the first delivery port is disposed substantially at a position aligned with the optical axis of the arc tube. Thus, the efficiency for cooling the arc tube improves.

In the light source device of the above application example, it is preferable that channels at which the cooling air is branched into parts flowing through the second and third delivery ports in the light source device of the above aspect are inclined to the first delivery port when the three delivery ports are viewed in the vertical direction.

According to the light source device having this structure, the channels at which the cooling air is branched into parts flowing through the second and third delivery ports are inclined to the direction of the first delivery port. In this case, the cooling airs delivered from the second and third delivery ports collide and mix with the cooling air delivered from the first delivery port. As a result, cooling air which includes turbulent flow effective for cooling is produced. Accordingly, cooling efficiency for the arc tube can further improve.

In the light source device of the above application example, it is preferable that the second and third delivery ports in the light source device of the above aspect are inclined to the first delivery port when the three delivery ports are viewed in the vertical direction.

According to the light source device having this structure, cooling air which includes turbulent flow effective for cooling is similarly produced when the second and third delivery ports are inclined to the direction of the first delivery port. Accordingly, cooling efficiency for the arc tube can further improve.

In the light source device of the above application example, it is preferable that the second and third delivery ports in the light source device of the above aspect are disposed substantially symmetric with respect to the first delivery port when the three delivery ports are viewed in the vertical direction.

According to the light source device having this structure, the second and third delivery ports are disposed substantially symmetric with respect to the first delivery port. In this case, the cooling airs delivered from the second and third delivery ports collide and mix with the cooling air delivered from the first delivery port substantially at the same position, in which condition the flow of the cooling air can be easily controlled such that the flow direction becomes stable and linear. Accordingly, the arc tube can be further efficiently cooled.

In the light source device of the above application example, it is preferable that the three delivery ports in the light source device of the above aspect are provided such that the cooling air delivered from the first delivery port collides with the cooling airs delivered from the second and third delivery ports within the space between the first delivery port and the light emission portion.

According to the light source device having this structure, the cooling air delivered from the first delivery port collides and mixes with the cooling airs delivered from the second and third delivery ports within the space between the first delivery port and the light emission portion. In this case, cooling air which has a stable flow direction and includes turbulent flow effective for cooling is produced. This cooling air directly contacts the light emission portion, which further improves cooling efficiency for the light emission portion.

In the light source device of the above application example, it is preferable that the three delivery ports in the light source device of the above aspect are provided such that the position where the cooling airs collide with each other is shifted toward the first delivery port from the middle between the first delivery port and the light emission portion.

According to the light source device having this structure, the position of collision lies at a position shifted toward the first delivery port from the middle between the first delivery port and the light emission portion. In this case, the cooling air delivered from the first delivery port collides with the cooling airs delivered from the second and third delivery ports in the upstream area within the space, wherefore the flow direction of the cooling air within the space can be further stabilized. Thus, the light emission portion can be further efficiently cooled.

In the light source device of the above application example, it is preferable that the housing in the light source device of the above aspect has another set of three delivery ports in addition to the set of the three delivery ports provided on the housing, the two sets of the three delivery ports being disposed substantially symmetric with respect to the horizontal plane passing through the optical axis.

According to the light source device having this structure, the arc tube can be cooled by using the three delivery ports either in the normal position placed on an installation surface such as a desk, or in the suspended position fixed to the ceiling or the like as the upside-down position of the normal position. In this case, the arc tube can be efficiently cooled regardless of the difference in the position of the light source device (normal position or suspended position). Accordingly, the life of the light source device increases.

A projector according to another application example of the invention includes any of the light source devices described above, and a light modulation device which modulates light emitted from the light source device according to image information.

The projector of this aspect of the invention includes the light source device capable of cooling the arc tube with higher efficiency, and therefore can project image light having predetermined luminance for a longer period. This advantage is provided regardless of the difference in the position of the projector (normal position or suspended position).

BRIEF DESCRIPTION OF THE DRAWINGS

The invention will be described with reference to the accompanying drawings, wherein like numbers reference like elements.

DESCRIPTION OF EXEMPLARY EMBODIMENT

An embodiment according to the invention is hereinafter described with reference to the drawings.

Structure of Projector

Figure 1:
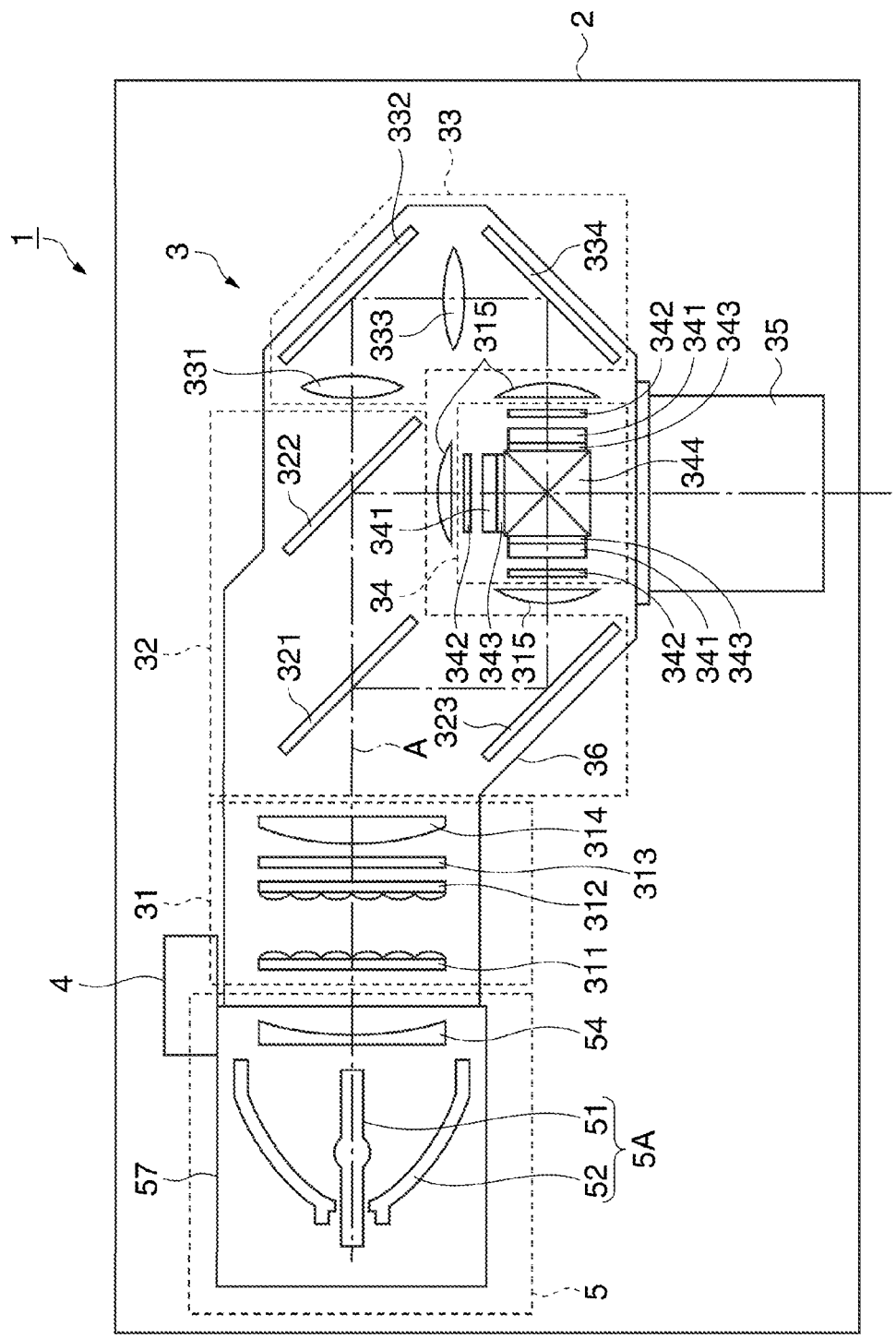
FIG. 1 schematically illustrates the general structure of a projector according to an embodiment.

FIG. 1 schematically illustrates the general structure of a projector 1 according this embodiment. The projector 1 forms image light corresponding to image information and projects the image light onto a screen (not shown). As illustrated in FIG. 1, the projector 1 chiefly includes an external housing 2 constituting the external case, an optical unit 3 housed within the external housing 2, a cooling fan 4, and others.

Structure of Optical Unit

The optical unit 3 forms image light corresponding to image information (image signals) under the control of a controller (not shown), and projects the image light thus formed. As illustrated in FIG. 1, the optical unit 3 includes a light source device 5, and an illumination device 31 which has lens arrays 311 and 312, a polarization converting element 313, a stacking lens 314, and a collimating lens 315. The optical unit 3 also includes a color separation device 32 which has dichroic mirrors 321 and 322 and a reflection mirror 323, and a relay device 33 which has an entrance side lens 331, a relay lens 333, and reflection mirror 332 and 334.

The optical unit 3 further includes an optical device 34 which has a light modulation unit constituted by three liquid crystal panels 341, three entrance side polarization plates 342, and three exit side polarization plates 343, and a color combining unit constituted by a cross dichroic prism 344, as well as a projection lens 35 as a projection device which projects image light formed by the optical device 34. The optical unit 3 still further includes an optical component housing 36 which houses the respective optical components 31 through 34 at predetermined positions on an illumination optical axis A established within the optical component housing 36.

According to the optical unit 3 thus constructed, light emitted from the light source device 5 and transmitted through the illumination device 31 is separated by the color separation device 32 into three color lights of R light, G light, and B light. The respective separated color lights are modulated by the corresponding liquid crystal panels 341 according to image information. The respective color lights thus modulated are combined by the cross dichroic prism 344 into image light, and projected through the projection lens 35 onto the screen.

The respective optical components 31 through 35 are similar to the corresponding parts included in a projector of various types currently available, and therefore not specifically explained herein. In the following description, therefore, the structure of the light source device 5 as the feature of the invention is only discussed.

Structure of Light Source Device

Figure 2:
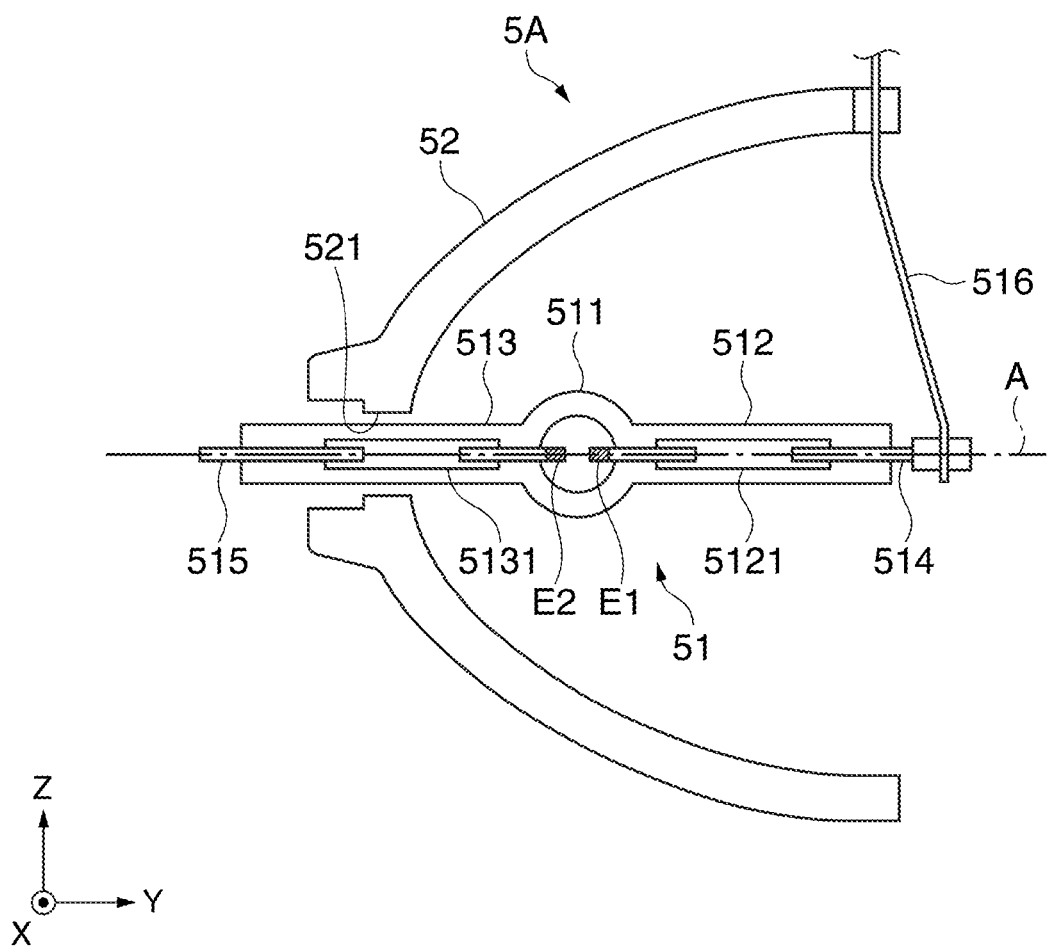
FIG. 2 is a vertical cross-sectional view schematically illustrating a light source device main body.

FIG. 2 is a vertical cross-sectional view schematically illustrating a light source device main body 5A.

FIG. 2 and later figures as depiction of this embodiment are shown by using the XYZ rectangular coordinate system for the convenience of explanation. More specifically, in the normal position of the projector 1, the Y direction corresponds to the direction of light emission from the light source device 5, i.e., the direction of the light source device 5 extending along the optical axis A. In this case, the +Y direction is the direction in which light travels after emission. The X direction corresponds to the direction of light projection from the projector 1. In this case, the +X direction is the direction in which light travels after projection from the projector 1. The Z direction corresponds to the vertical direction crossing the Y direction and the X direction at right angles. In this case, the +Z direction is the upward vertical direction (direction opposite to the direction of gravity). When viewed in the respective figures, the +Y direction corresponds to the front direction (−Y direction: rear direction), the +X direction corresponds to the left direction (−X direction: right direction), and the +Z direction corresponds to the upward direction (−Z direction: downward direction).

As illustrated in FIG. 1, the light source device 5 includes the light source device main body 5A which has an arc tube 51 and a reflector 52, a collimating lens 54, and a housing 57 which houses these components. As illustrated in FIG. 2, the arc tube 51 has a light emission portion 511 which expands in an approximately spherical shape, and a pair of sealing portions 512 and 513 which extend in directions away from each other from both ends of the light emission portion 511 with the light emission portion 511 positioned between the sealing portions 512 and 513. In the following description, the sealing portion 512 disposed on the front side is referred to as the front sealing portion 512, while the sealing portion 513 disposed on the rear side is referred to as the rear sealing portion 513, for the convenience of explanation.

The light emission portion 511 contains a pair of electrodes E1 and E2, between which electrodes E1 and E2 a discharge space is formed as a space into which light emitting substances including mercury, rare gas, and a small amount of halogen are sealed. Metal foils 5121 and 5131 made of molybdenum and electrically connected with the electrodes E1 and E2, respectively, are inserted into the corresponding sealing portions 512 and 513. The ends of the respective sealing portions 512 and 513 on the sides opposite to the light emission portion 511 are sealed by glass or other materials.

The respective metal foils 5121 and 5131 connect with electrode extension lines 514 and 515, respectively, which extend to the outside of the arc tube 51. The electrode extension lines 514 and 515 are lines to which voltage is applied to cause light emission from the interior of the light emission portion 511. The electrode extension line 514 joined with the front sealing portion 512 further connects with one end of a lead 516 which has a connection to a connector (not shown) provided outside the light source device 5.

The reflector 52 has the function of reflecting received light toward a predetermined focus so that the reflected light can be converged thereat. The arc tube 51 is fixed to the reflector 52 by junction between a part of the rear sealing portion 513 and a cylindrical opening 521 of the reflector 52 via an adhesive (not shown) in such a position that the light emission center of the light emission portion 511 coincides with the focus of the reflector 52.

Figure 3:
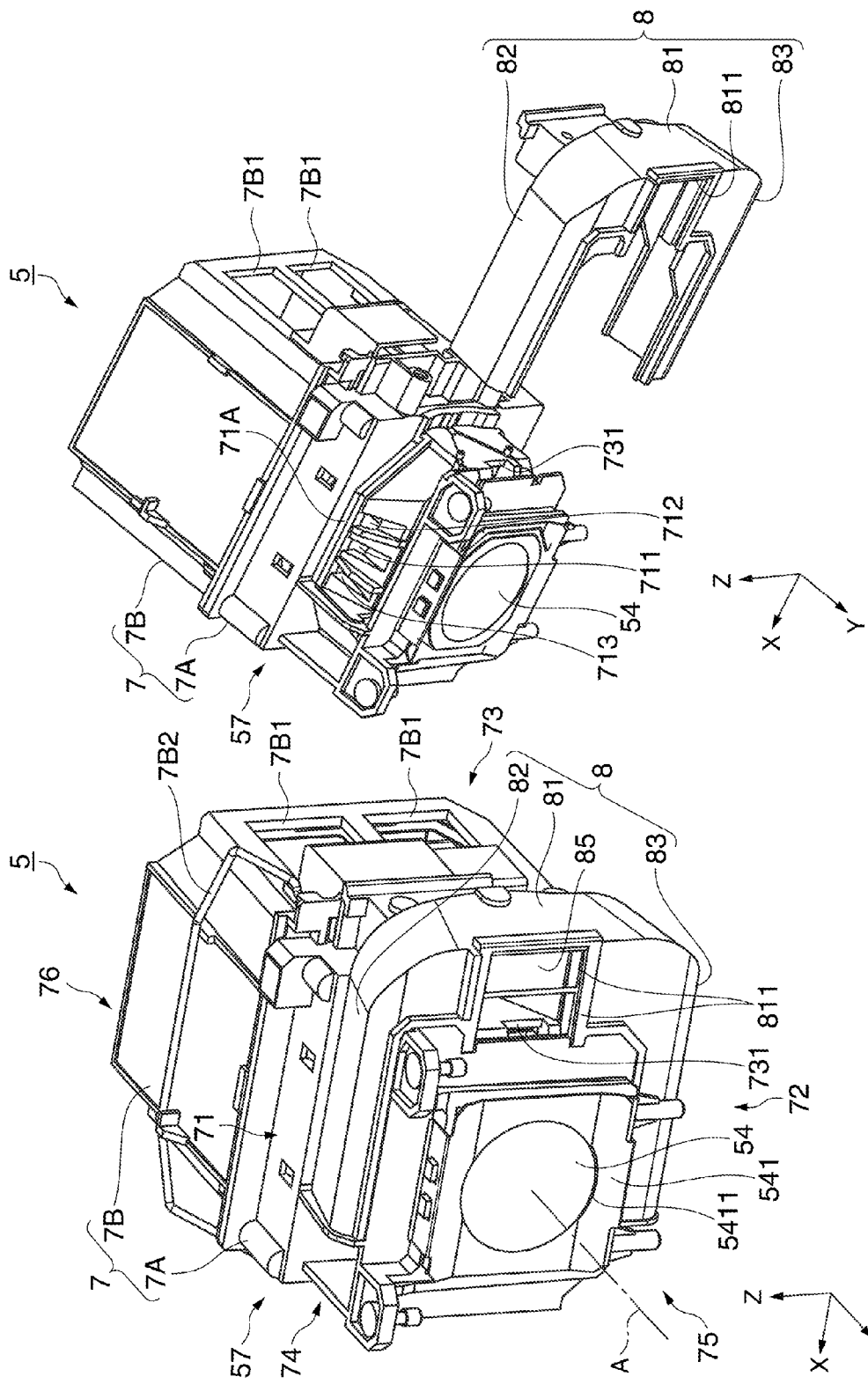
FIGS. 3A and 3B are perspective views illustrating the external appearance of a light source device.

FIGS. 3A and 3B are perspective views illustrating the external appearance of the light source device 5. More specifically, FIG. 3A is a perspective view of the light source device 5 as viewed from the upper front, while FIG. 3B is a perspective view of the light source device 5 from which a duct 8 is removed in the condition shown in FIG. 3A. These figures illustrate the condition of the light source device 5 of the projector 1 placed in the normal position.

As explained above, the light source device 5 includes the light source device main body 5A, the collimating lens 54, and the housing 57. The housing 57 which houses and fixes the light source device main body 5A also has the function of supporting the collimating lens 54. As can be seen from FIGS. 3A and 3B, the housing 57 chiefly includes a fixing frame body 7 and the duct 8.

The fixing frame body 7 has a first fixing frame 7A and a second fixing frame 7B. The first fixing frame 7A is a member which produces channels for cooling air when the duct 8 is fixed to the first fixing frame 7A. In addition, the first fixing frame 7A supports and fixes the collimating lens 54. The second fixing frame 7B covers the back part (rear part) of the reflector 52 to protect a user of the projector 1 from direct contact with the electrode extension line 515 extended from the rear sealing portion 513. The second fixing frame 7B is fixed to the first fixing frame 7A by screws to be combined with the first fixing frame 7A into one unit of the fixing frame body 7.

The second fixing frame 7B has openings 7B1 though which air is introduced and supplied toward the outside surface of the reflector 52 to cool the reflector 52. The second fixing frame 7B further has a grip 7B2 held by the user when the light source device 5 is attached or detached.

Structure of Duct

As illustrated in FIGS. 3A and 3B, the duct 8 is attached to the fixing frame body 7 (more specifically, a top surface 71, a bottom surface 72, and a right side surface 73 (described later) of the first fixing frame 7A). The duct 8 has the function of guiding cooling air delivered from the cooling fan 4 (see FIG. 1) toward the interior of the first fixing frame 7A.

The duct 8 has a substantially U shape which is substantially symmetric with respect to the X-Y plane passing through the illumination optical axis A. As illustrated in FIG. 3B, the inside of the duct 8 is an open space provided as a hollow portion, so that channels can be produced when the duct 8 is attached to the first fixing frame 7A.

In the following description, the upper part of the duct 8 extended to the left (+X direction) is called a second duct portion 82, the lower part of the duct 8 extended to the left (+X direction) is called a third duct portion 83, and the part of the duct 8 provided as a junction between the second duct portion 82 and the third duct portion 83 and extended in the up-down direction (Z direction) is called a first duct portion 81.

The duct 8 accommodates a plate-shaped flow switching member 85 supported at a position facing to an opening 811 in such a condition as to be freely rotatable. The flow switching member 85, which is designed to be freely rotatable around a pair of support shafts (not shown), rotates by its own weight to be inclined in the direction of gravity (inclined at approximately 45 degrees with respect to the Y direction in this embodiment). The flow switching member 85 in the rotated condition closes the channel extending in the downward direction. Thus, cooling air introduced through the opening 811 collides with the flow switching member 85, thereby flowing in the direction opposite to the direction of gravity (upward direction) either in the normal position or the suspended position of the projector 1.

As illustrated in FIG. 3B, the duct 8 is slid in the direction from the right side surface 73 of the first fixing frame 7A (−X side) to the left side surface 74 (+X side) to be fixed to the fixing frame body 7 (first fixing frame 7A) by screws into one body. More specifically, the duct 8 is slid from the right (−X side) to the left (+X side) with the second duct portion 82 of the duct 8 shifted along an opening 71A (described later) of the top surface 71 of the first fixing frame 7A, and the third duct portion 83 of the duct 8 shifted along an opening (not shown) of the bottom surface 72 of the first fixing frame 7A. After the sliding to an appropriate position, the duct 8 is fixed by screws.

In the assembled condition, the duct 8 covers the top surface 71, the bottom surface 72, and the right side surface 73 of the first fixing frame 7A as illustrated in FIG. 3A. More specifically, the first duct portion 81 covers the right side surface 73 of the first fixing frame 7A, the second duct portion 82 covers the top surface 71 of the first fixing frame 7A, and the third duct portion 83 covers the bottom surface 72 of the first fixing frame 7A. Under this condition, channels are produced between the right side surface 73 and the first duct portion 81, between the top surface 71 and the second duct portion 82, and between the bottom surface 72 and the third duct portion 83. These channels are passages through which cooling air introduced via the opening 811 flows.

Structure of First Fixing Frame

Figure 4:
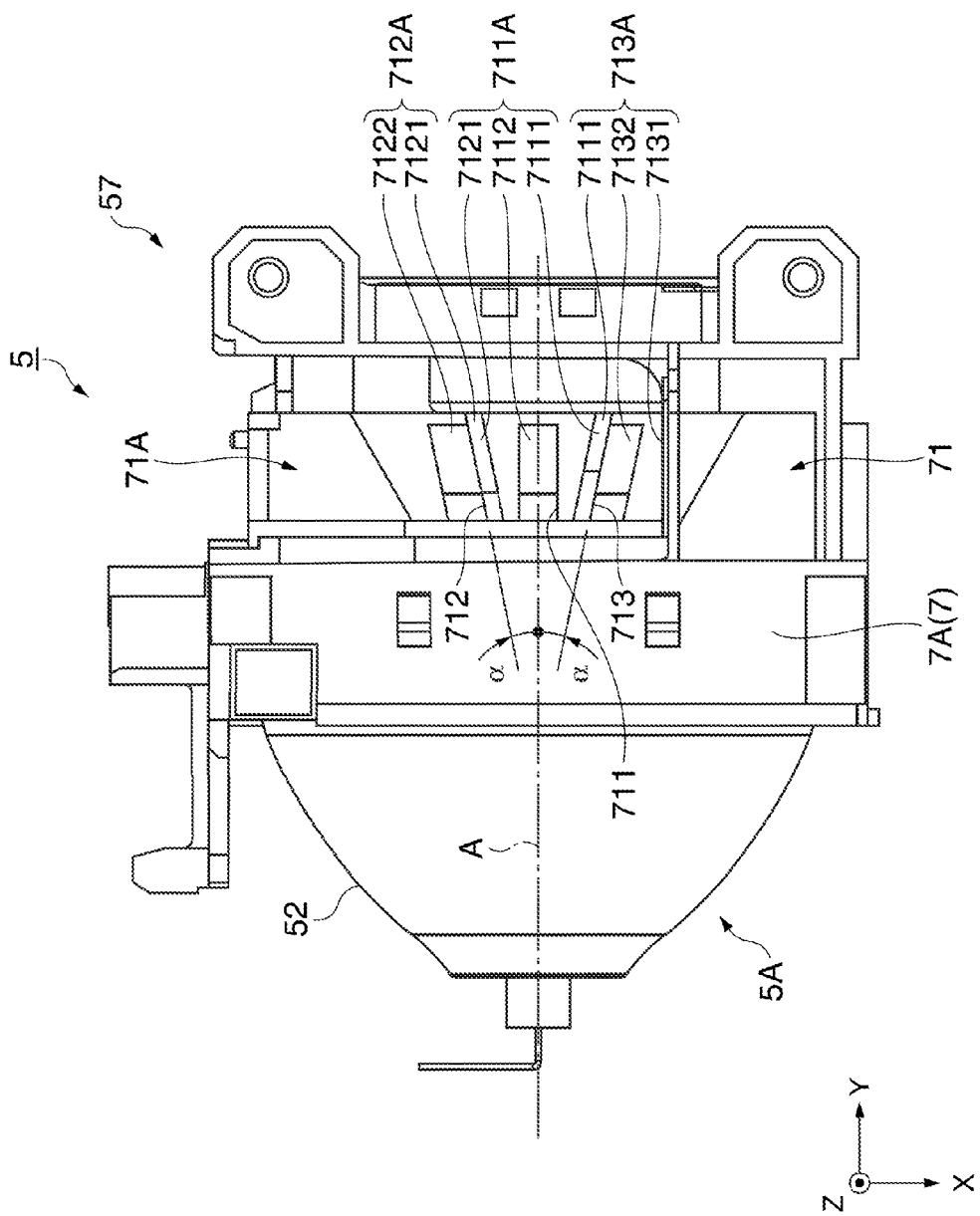
FIG. 4 is a plan view of the light source device as viewed from above.
Figure 5:
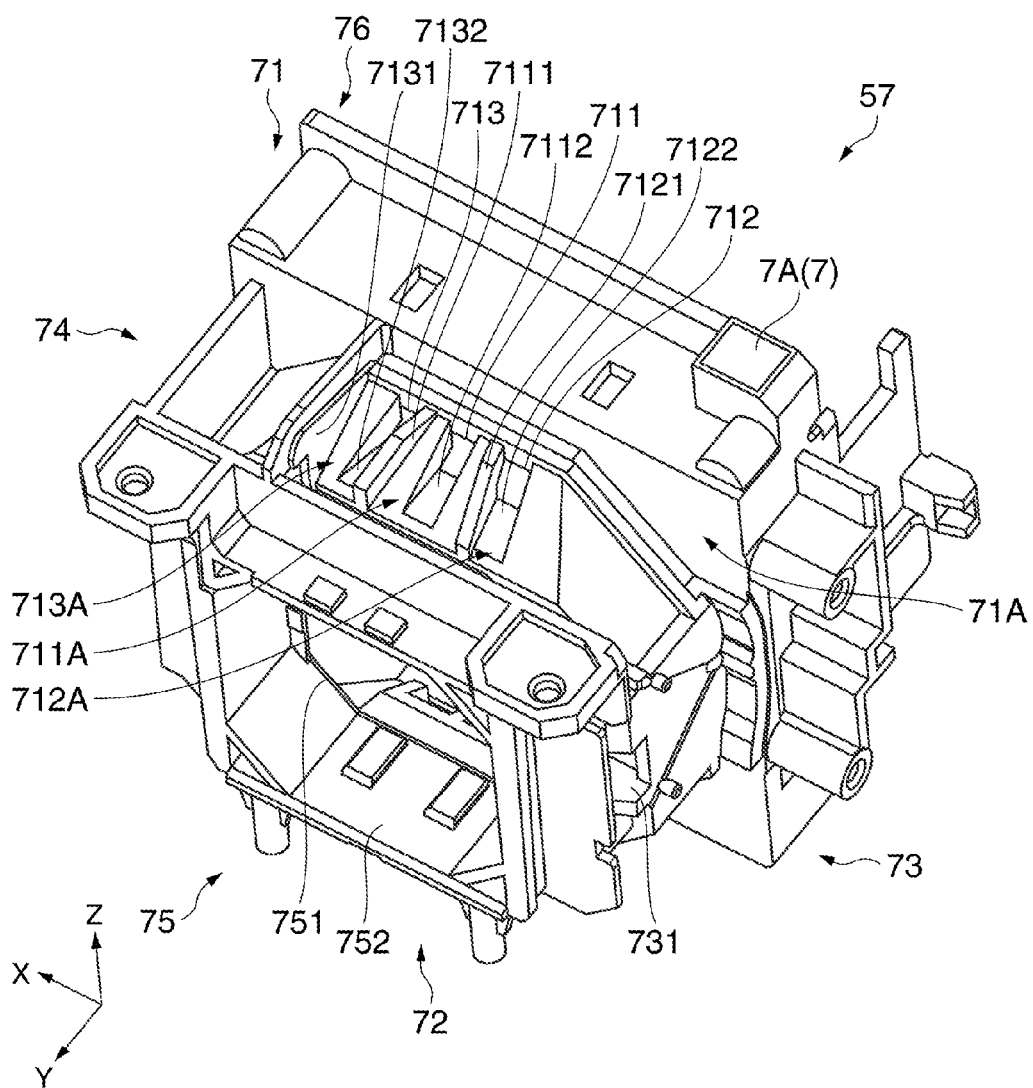
FIG. 5 is a perspective view of a first fixing frame.
Figure 6:
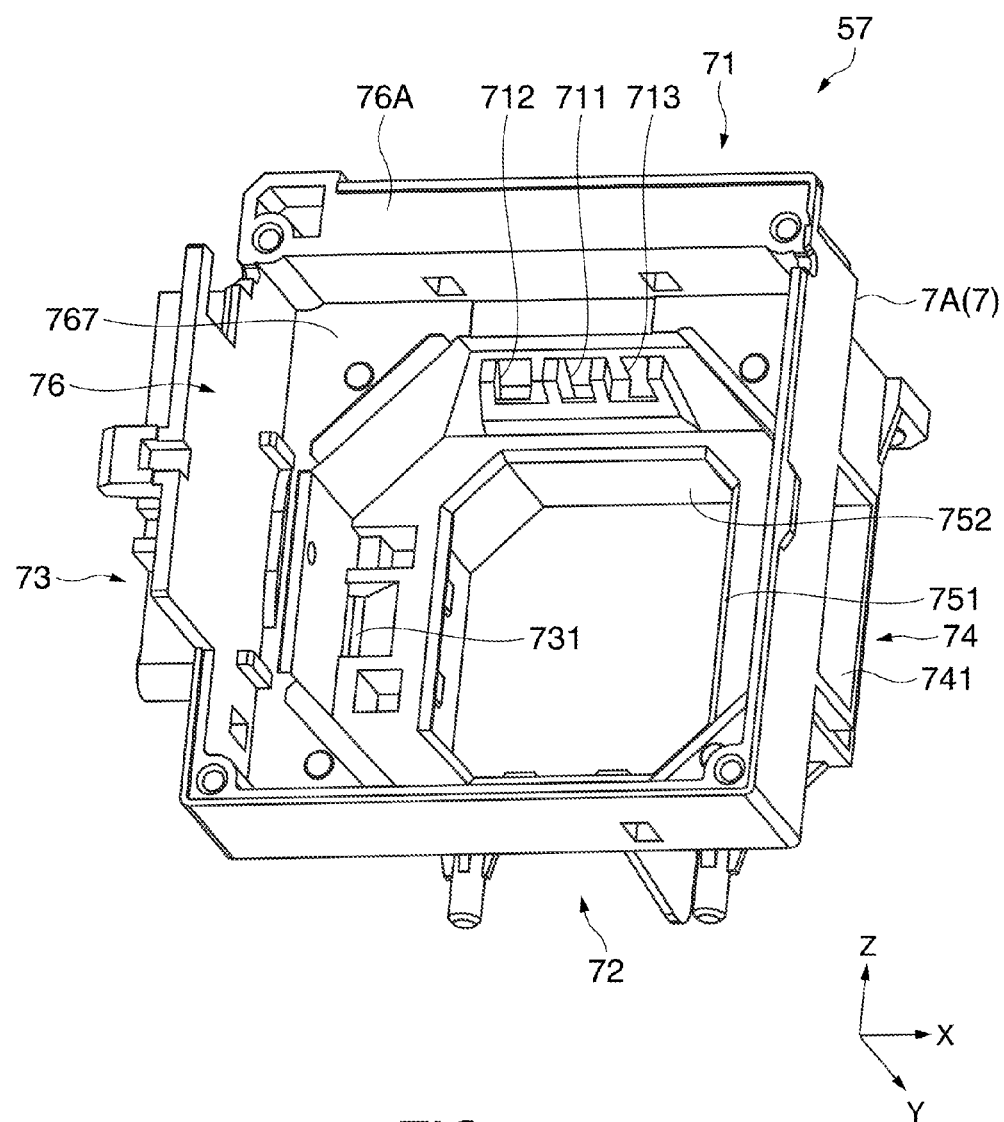
FIG. 6 is a perspective view of the first fixing frame.

FIG. 4 is a plan view illustrating the light source device 5 as viewed from above. This figure shows the light source device 5 from which the second fixing frame 7B and the duct 8 are removed. FIGS. 5 and 6 are perspective views of the first fixing frame 7A. More specifically, FIG. 5 is a perspective view of the first fixing frame 7A as viewed from an upper (+Z side) front (+Y side) position, and FIG. 6 is a perspective view of the first fixing frame 7A as viewed from a lower (−Z side) rear (−Y side) position.

The first fixing frame 7A holds and fixes the light source device main body 5A and the collimating lens 54. As illustrated in FIG. 5, the first fixing frame 7A has a substantially square pole box-like shape. More specifically, the first fixing frame 7A has the top surface 71 and the bottom surface 72 positioned in the up-down direction, and the right side surface 73 and the left side surface 74 positioned in the left-right direction. The first fixing frame 7A further has a front surface 75 and a rear surface 76 positioned in the front-rear direction. After the assembly for fixing the reflector 52 to the rear surface 76 and supporting the collimating lens 54 by the front surface 75, the first fixing frame 7A forms a space S (see FIG. 7) through which cooling air flows toward the arc tube 51 as cooling air for the arc tube 51.

The top surface 71 of the first fixing frame 7A has the opening 71A open to the right and above. The opening 71A is closed by the duct 8 (second duct portion 82). By this arrangement, the cooling air flowing within the duct 8 (first duct portion 81 and second duct portion 82) is introduced into the first fixing frame 7A.

As illustrated in FIG. 5, the front surface 75 has a substantially octangular opening 751 through which light emitted from the light source device main body 5A accommodated in the first fixing frame 7A passes toward the front. A guide portion 752 having a substantially octangular inner surface shape is provided on the front outside surface of the opening 751. The collimating lens 54 is inserted from the front (+Y direction) into the guide portion 752.

After insertion of the collimating lens 54 into the guide portion 752, a collimating lens fixing frame 541 as an elastic component having a substantially rectangular plate shape, at the center of which frame 541 an opening 5411 is formed, is pressed from the front of the collimating lens 54 against projections provided on the upper and lower parts (top surface 71 side and bottom surface 72 side) of the front surface 75 of the first fixing frame 7A to be hooked to the projections as illustrated in FIGS. 3A and 3B. As a consequence, the collimating lens 54 is supported by the front surface 75 of the first fixing frame 7A and fixed thereto.

As illustrated in FIGS. 4 and 5, three delivery ports are provided inside the opening 71A of the first fixing frame 7A (top surface 71). These three delivery ports are constituted by a first delivery port 711 disposed such that the center of the first delivery port 711 is located substantially at a position aligned with the illumination optical axis A as viewed from the top (vertical direction), and a second delivery port 712 and a third delivery port 713 disposed on one and the other sides of the first delivery port 711, respectively, with respect to the illumination optical axis A. More specifically, the first delivery port 711 is positioned such that the center of the first delivery port 711 lies substantially at a position in the vertical plane passing through the illumination optical axis A, and the second delivery port 712 and the third delivery port 713 are positioned substantially symmetric with respect to the first delivery port 711. The three delivery ports are arranged in the order of the second delivery port 712, the first delivery port 711, and the third delivery port 713 in the direction from the right (−X side) to the left (+X side).

As illustrated in FIGS. 4 and 5, three channels are further provided inside the opening 71A as passages through each of which partial air branched from the cooling air flowing within the duct 8 (second duct portion 82) passes to enter the corresponding one of the three delivery ports. More specifically, the three channels are constituted by a first channel 711A through which air is introduced into the first delivery port 711, a second channel 712A through which air is introduced into the second delivery port 712, and a third channel 713A through which air is introduced into the third delivery port 713.

The second channel 712A has a wall 7121 and a groove 7122. The wall 7121 blocks cooling air coming from the inside of the second duct portion 82 to introduce a predetermined amount of cooling air through the groove 7122 into the second delivery port 712.

The first channel 711A has a wall 7111, a groove 7112, and the wall 7121 which forms the second channel 712A as well. The wall 7111 blocks cooling air coming from the inside of the second duct portion 82 and flowing over the wall 7121 to introduce a predetermined amount of cooling air through the groove 7112 into the first delivery port 711.

The third channel 713A has a wall 7131, a groove 7132, and the wall 7111 which forms the first channel 711A as well. The wall 7131 blocks cooling air coming from the inside of the second duct portion 82 and flowing over the two walls 7121 and 7111 to introduce a predetermined amount of cooling air through the groove 7132 into the third delivery port 713. The wall 7131 further functions as a wall for sealing the tip of the duct 8 (second duct portion 82).

As illustrated in FIG. 4, the wall 7121 and the groove 7122 of the second channel 712A, and the wall 7111 and the groove 7132 of the third channel 713A are disposed symmetric with respect to the illumination optical axis A as viewed from above, and are inclined to the direction of the first delivery port 711. In this arrangement, the two delivery ports disposed on the sides (second delivery port 712 and third delivery port 713) are similarly inclined to the first delivery port 711. More specifically, each of the second delivery port 712 and the third delivery port 713 is inclined to the center line of the illumination optical axis A at an angle α when the top surface 71 is viewed in the vertical direction (Z direction).

According to this structure, the first channel 711A becomes narrower in the direction toward the first delivery port 711 by the inclinations of the walls 7111 and 7121 as illustrated in FIG. 4. In this case, the cooling air delivered from the first delivery port 711 has a pressure higher than those of the cooling airs delivered from the second delivery port 712 and the third delivery port 713 disposed on the sides, and becomes jet flow when leaving the first delivery port 711.

An opening (not shown) opened to the right and below as an opening substantially similar to the opening 71A is formed on the bottom surface 72 of the first fixing frame 7A. This opening is closed by the duct 8 (third duct portion 83). Thus, in the suspended position of the projector 1, cooling air introduced through the opening 811 and coming from the inside of the duct 8 (first dust portion 81 and third duct portion 83) flows into the first fixing frame 7A.

A structure similar to the structure of the channels and the delivery ports provided within the opening 71A of the top surface 71 is also equipped within the opening of the bottom surface 72 in such a manner that these structures within the top surface 71 and the bottom surface 72 become symmetric with respect to the horizontal plane (X-Y plane) passing through the illumination optical axis A. Therefore, three delivery ports (fourth delivery port, fifth delivery port, and sixth delivery port, none of which is shown) are also provided in correspondence with the three delivery ports discussed above (first delivery port 711, second delivery port 712, and third delivery port 713) such that the two sets of the three delivery ports are symmetrically disposed. Moreover, channels (not shown) associated with the three delivery ports within the bottom surface 72 are similarly equipped.

As illustrated in FIG. 6, the rear surface 76 of the first fixing frame 7A has a substantially rectangular opening 76A opened to the rear (−Y direction). A holding portion 767 is provided inside the rectangular opening 76A as a step concaved toward the inside. The light source device main body 5A is held by the contact between the holding portion 767 and the tip of the reflector 52 including the corner edges thereof.

As illustrated in FIG. 6, the three delivery ports (first delivery port 711, second delivery port 712, and third delivery port 713) disposed side by side below the holding portion 767 are exposed in the upper area of the opening 76A (above the arc tube 51).

As illustrated in FIG. 6, the three delivery ports (first delivery port 711, second delivery port 712, and third delivery port 713) are positioned outside the opening 751 through which light passes. In other words, the three delivery ports are located outside the area through which light reflected by the reflector 52 travels. The fourth delivery port, the fifth delivery port, and the sixth delivery port are disposed in a similar manner.

As illustrated in FIGS. 5 and 6, a rectangular opening 731 is formed in the wall extending from the opening 751 toward the right side surface 73. This opening 731 provided substantially at the center of the wall in the vertical direction is an opening through which a part of cooling air flowing through the duct 8 (first duct portion 81) is introduced into the first fixing frame 7A (space S) and supplied chiefly toward the junction between the electrode extension line 514 and the metal foil 5121 of the arc tube 51 (front sealing portion 512) illustrated in FIG. 2 to cool this junction area.

As illustrated in FIG. 6, a rectangular discharge port 741 is formed in the wall of the left side surface 74 of the first fixing frame 7A. The discharge port 741 provided substantially at the center of the wall in the vertical direction is an opening through which cooling air heated after flowing through the space S is discharged from the first fixing frame 7A (housing 57) to the outside.

Flow of Cooling Air

Figure 7:
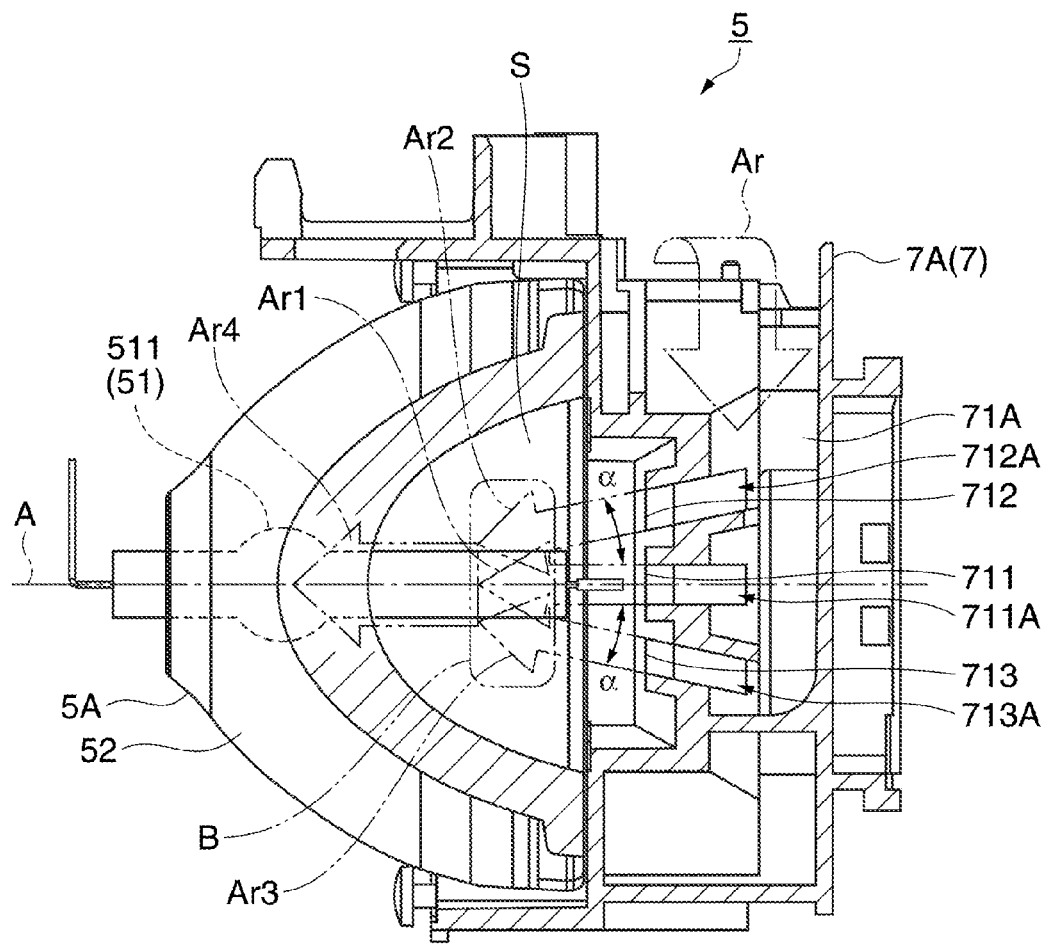
FIG. 7 schematically illustrates flow of cooling air when the light source device is viewed from above.
Figure 8:
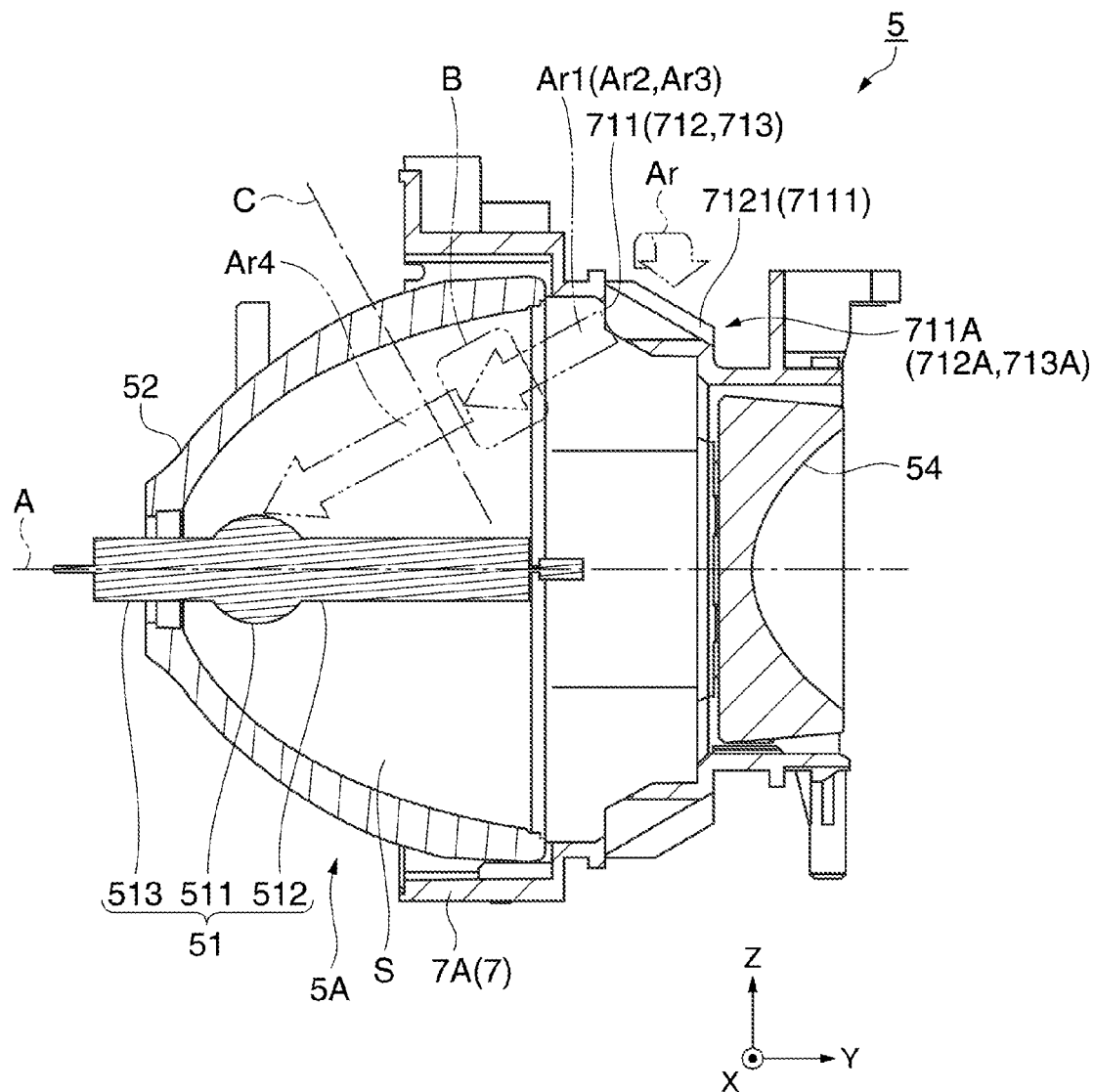
FIG. 8 schematically illustrates flow of cooling air when the light source device is viewed from the side.

FIG. 7 schematically illustrates the flow of cooling air Ar when the light source device 5 is viewed from above. FIG. 8 schematically illustrates the flow of the cooling air Ar when the light source device 5 is viewed from the side (+X side). FIG. 7 shows the first fixing frame 7A and the light source device main body 5A as viewed from above, including schematic cross sections of the first fixing frame 7A and the light source device main body 5A located in the vicinity of the three delivery ports. FIG. 8 is a cross-sectional view of the light source device 5 taken along the Y-Z plane passing through the illumination optical axis A. In FIGS. 7 and 8, the flow of the cooling air Ar is schematically illustrated by arrows.

Hereinafter discussed is the flow of the cooling air Ar which cools the light source device 5 of the projector 1 placed in the normal position.

Cooling air (called "cooling air Ar") delivered from the cooling fan 4 (see FIG. 1) flows into the duct 8 via the opening 811 of the duct 8. The cooling air Ar introduced into the duct 8 flows through the first duct portion 81 in the upward direction (+Z direction) by the guide of the flow switching member 85 (see FIG. 3A) rotatable by its own weight, and enters the second duct portion 82 connected with the first duct portion 81.

A part of the cooling air Ar introduced through the opening 811 is delivered into the space S via the opening 731 (see FIG. 5). This part of the cooling air is supplied chiefly to the junction area between the electrode extension line 514 and the metal foil 5121 of the arc tube 51 (front sealing portion 512) shown in FIG. 2 to cool this junction area as noted above. The cooling air heated after cooling the junction area is discharged through the discharge port 741 to the outside of the housing 57.

As illustrated in FIG. 7, the cooling air Ar introduced into the second duct portion 82 is branched into parts flowing along the first channel 711A, the second channel 712A, and the third channel 713A, and delivered from the first delivery port 711, the second delivery port 712, and the third delivery port 713 into the space S. In the following description, the cooling air delivered from the first delivery port 711, the cooling air delivered from the second delivery port 712, and the cooling air delivered from the third delivery port 713 are referred to as cooling air Ar1, cooling air Ar2, and cooling air Ar3, respectively.

As noted above, each of the second delivery port 712, the third delivery port 713, the second channel 712A, and the third channel 713A is inclined to the direction of the first delivery port 711 (inclined to the center line of the illumination optical axis A at the angle α). Thus, each of the cooling airs Ar2 and Ar3 is delivered with inclination of the angle α (angle α in the horizontal plane (X-Y plane)) when the top surface 71 is viewed in the vertical direction (Z direction) as illustrated in FIG. 7. The cooling air Ar1 is delivered in the direction along the illumination optical axis A when the top surface 71 is viewed in the vertical direction.

As can be seen from FIG. 8, the three delivery ports are located substantially at the same position in the up-down direction as viewed from the side (X direction). Thus, the cooling airs Ar1, Ar2, and Ar3 are delivered toward the light emission portion 511 substantially at the same angle in the vertical plane (Y-Z plane) with respect to the illumination optical axis A as viewed from the side.

Each of the cooling airs Ar2 and Ar3 delivered from the second delivery port 712 and the third delivery port 713 into the space S is inclined to the cooling air Ar1 at the angle α. Thus, these cooling airs Ar2 and Ar3 collide with the cooling air Ar1 delivered from the first delivery port 711 at a position between the first delivery port 711 and the light emission portion 511 as illustrated in FIG. 7. This collision position is located in an area indicated as "B" in the figure in this embodiment. More specifically, as can be seen from FIG. 8, the area B is determined at a position shifted toward the first delivery port 711 from a line C representing the middle between the first delivery port 711 and the light emission portion 511.

By collision between the cooling air Ar1 and the cooling airs Ar2 and Ar3 supplied from the sides of the cooling air Ar1, these three cooling airs (cooling airs Ar1, Ar2, and Ar3) mix with each other. The mixed cooling air (hereinafter referred to as "cooling air Ar4") flows toward the light emission portion 511 to be supplied to the upper part of the light emission portion 511 as illustrated in FIGS. 7 and 8. The cooling air Ar4 as a mixture of the three cooling airs (cooling airs Ar1, Ar2, and Ar3) has turbulent components effective for cooling, thereby promoting heat exchange during collision between the cooling air Ar4 and the upper part of the light emission portion 511. Moreover, the flow direction of the cooling air is linear and stable, which allows the cooling air to flow securely toward the upper part of the light emission portion 511.

Moreover, the collision in the area B is located at a position shifted toward the first delivery port 711 from the line C representing the middle between the first delivery port 711 and the light emission portion 511. In this case, the flow direction of the cooling air Ar1 (cooling air Ar4) can be stabilized in the upstream area of the space S.

The cooling air Ar4 supplied to the upper part of the light emission portion 511 cools this part, while a part of the cooling air Ar4 flowing toward the lower part of the light emission portion 511 cools the lower part of the light emission portion 511. The cooling air Ar4 also cools the whole internal area of the space S. The cooling air heated after cooling the respective components is discharged through the discharge port 741 (see FIG. 6) and the opening 521 of the reflector 52 (see FIG. 2) to the outside of the housing 57.

While the flow of the cooling air Ar for cooling the light source device 5 of the projector 1 placed in the normal position has been discussed, this course of flow also applies to the cooling air Ar for cooling the light source device 5 of the projector 1 attached to the ceiling or the like in the suspended position. The only difference is that the cooling air Ar for cooling the light source device 5 positioned upside down flows through the inside of the first duct portion 81 and the third duct portion 83 by the guide of the flow switching member 85, and then is branched into parts each to be delivered through the corresponding one of the fourth delivery port, the fifth delivery port, and sixth delivery port.

As noted above, the set of the fourth delivery port, the fifth delivery port, and the sixth delivery port and the set of the first delivery port 711, the second delivery port 712, and the third delivery port 713 are disposed substantially symmetric with respect to the horizontal plane (X-Y plane) passing through the illumination optical axis A. In this case, the flow of the cooling air Ar delivered from the fourth through sixth delivery ports into the space S becomes similar to the corresponding flow delivered from the first through third delivery ports 711 through 713, and therefore the cooling action of the cooling air Ar within the space S after delivery from the fourth through sixth delivery ports also becomes substantially equivalent. Thus, the same explanation of this action is not repeated herein.

According to this embodiment, the following advantages can be offered.

The housing 57 (first fixing frame 7A) of the light source device 5 in this embodiment has three delivery ports through which cooling air is delivered into the space S. These three delivery ports disposed above the arc tube 51 are constituted by the first delivery port 711 whose center is located substantially at a position aligned with the illumination optical axis A, and the second delivery port 712 and the third delivery port 713 located on one and the other sides of the first delivery port 711. The pair of the second delivery port 712 and the third delivery port 713, and the pair of the second channel 712A and the third channel 713A are disposed symmetric with respect to the first delivery port 711, and each of the pair of the delivery ports 712 and 713 and each of the pair of the channels 712A and 713A is inclined to the first delivery port 711 at the angle α. According to this structure, the cooling airs Ar2 and Ar3 delivered from the second delivery port 712 and the third delivery port 713 collide with the cooling air Ar1 delivered from the first delivery port 711 substantially at the same position, and mix with the cooling air Ar1 thereat. As a result, the cooling air Ar4 which includes turbulent flow effective for cooling can be produced, and the flow of the cooling air Ar4 (cooling air Ar1) thus produced can be easily controlled such that the flow direction becomes stable and linear. Accordingly, the arc tube 51 (light emission portion 511) can be cooled with high efficiency.

According to the light source device 5 in this embodiment, the cooling air Ar1 delivered from the first delivery port 711 of the housing 57 (first fixing frame 7A) is directed toward the light emission portion 511. Thus, the light emission portion 511 can be cooled by direct supply of the cooling air Ar1. Moreover, the cooling airs Ar2 and Ar3 delivered from the second delivery port 712 and the third delivery port 713 disposed on the sides collide and mix with the cooling air Ar1, and the cooling air Ar4 as the mixture is supplied to the light emission portion 511. Therefore, the light emission portion 511 can be cooled with excellent efficiency.

According to the light source device 5 in this embodiment, the cooling air Ar1 delivered from the first delivery port 711 collides with the cooling airs Ar2 and Ar3 delivered from the second delivery port 712 and the third delivery port 713 disposed on the sides, and mixes with the cooling airs Ar2 and Ar3 at the collision position in the space S between the first delivery port 711 and the light emission portion 511. The mixing position (area B) is a position shifted toward the first delivery port 711 from the middle between the first delivery port 711 and the light emission portion 511. According to this structure, the cooling air Ar1 collides and mixes with the cooling airs Ar2 and Ar3 delivered from the second delivery port 712 and the third delivery port 713 disposed on the sides immediately after the discharge from the first delivery port 711. In this case, the flow direction of the cooling air Ar4 (cooling air Ar1) can be stabilized in the relatively upstream area within the space S, which contributes to further easy control over the position of the cooling air Ar4. Therefore, the light emission portion 511 can be further efficiently cooled.

According to the light source device 5 in this embodiment, the housing 57 (first fixing frame 7A) has the three delivery ports (fourth delivery port, fifth delivery port, and sixth delivery port) as well as the three delivery ports (first delivery port 711, second delivery port 712, and third delivery port 713)

arranged such that the two sets of the three delivery ports become substantially symmetric with respect to the horizontal plane (X-Y plane) passing through the illumination optical axis A. According to this structure, the arc tube 51 can be cooled by using the three delivery ports positioned above the arc tube 51 either in the normal position of the projector 1 placed on an installation surface such as a desk, or in the suspended position of the projector 1 fixed to the ceiling or the like as the upside-down position of the normal position. In this case, the arc tube 51 can be efficiently cooled regardless of the difference in the position of the light source device 5 (normal position or suspended position). Accordingly, the life of the light source device 5 increases.

The projector 1 in this embodiment which includes the light source device 5 capable of cooling the arc tube 51 with higher efficiency can project image light having predetermined luminance for a longer period. This advantage is provided regardless of the difference in the position of the projector 1 (normal position or suspended position).

According to the projector 1 in this embodiment which includes the light source device 5 capable of cooling the arc tube 51 with higher efficiency, increase in the size of the cooling fan 4 and increase in the driving voltage for the cooling fan 4 can be reduced to the minimum, for example, even when the luminance of the light source device main body 5A is raised. This structure contributes to prevention of size increase and noise generation of the projector 1. When the light emission efficiency of the arc tube 51 is equivalent to that of a related-art arc tube, size decrease and noise reduction of the projector 1 can be realized. This advantage can be offered regardless of the difference in the position of the projector 1 (normal position or suspended position).

In the foregoing specification, the invention has been described with reference to a specific embodiment thereof. It will, however, be evident that various modifications and changes, including the followings, may be made thereto without departing from the scope and spirit of the invention.

According to the light source device 5 in this embodiment, the cooling air Ar1 delivered from the first delivery port 711 collides and mixes with the cooling airs Ar2 and Ar3 delivered from the second delivery port 712 and the third delivery port 713 disposed on the sizes. However, each of the three delivery ports disposed adjacent to each other (for example, first delivery port 711, second delivery port 712, and third delivery port 713) may supply cooling airs for each to the light emission portion 511 without collision between each other in the course of the delivery to the light emission portion 511. According to this structure, the cooling air delivered from the delivery port positioned at the center is sandwiched between the cooling airs delivered from the delivery ports disposed on the sides during flow, in which condition the delivery direction (flow direction) of the cooling air can be kept constant. Thus, the flow direction of the cooling air can be appropriately controlled such that the cooling air can reach the upper part of the arc tube 51 (light emission portion 511) and cool this part with high efficiency.

According to the light source device 5 in this embodiment, the cooling air Ar1 delivered from the first delivery port 711 mixes with the cooling airs Ar2 and Ar3 delivered from the second delivery port 712 and the third delivery port 713 at a position shifted toward the first delivery port 711 from the middle between the first delivery port 711 and the light emission portion 511. However, the cooling air Ar1 may mix with the cooling airs Ar2 and Ar3 at any position within the space S between the first delivery port 711 and the light emission portion 511.

Each of the second delivery port 712 and the third delivery port 713 provided on the first fixing frame 7A in this embodiment is disposed inclined to the first delivery port 711 at the angle $\alpha$. According to this structure, the cooling airs Ar2 and Ar3 delivered from the second delivery port 712 and the third delivery port 713 collide and mix with the cooling air Ar1 delivered from the first delivery port 711 substantially at the same position (area B). However, the respective angles of the second delivery port 712 and the third delivery port 713, and of the second channel 712A and the third channel 713A with respect to the first delivery port 711 are not required to be the same. In other words, the second delivery port 712 and the third delivery port 713, and the second channel 712A and the third channel 713A may be arranged at any positions as long as they are inclined to the direction of the first delivery port 711. For example, the cooling airs Ar2 and Ar3 delivered from the second delivery port 712 and the third delivery port 713 may collide and mix with the cooling air Ar1 at different positions with respect to the cooling air Ar1 delivered from the first delivery port 711 as long as the cooling air Ar1 delivered from the first delivery port 711 (cooling air Ar4 as mixture) can flow toward the cooling target as a consequence.

According to this embodiment, each of the pair of the second delivery port 712 and the third delivery port 713, and each of the pair of the second channel 712A and the third channel 713A provided on the first fixing frame 7A is inclined to the first delivery port 711 at the angle $\alpha$. However, such an arrangement is allowed in which each of only the pair of the second delivery port 712 and the third delivery port 713, or the pair of the second channel 712A and the third channel 713A is inclined at the angle $\alpha$. In any arrangements, the same advantage can be provided as long as the cooling airs Ar2 and Ar3 are designed to collide with the cooling air Ar1.

According to the light source device 5 in this embodiment, the second delivery port 712 and the third delivery port 713 are designed such that the air amounts and air pressures of the cooling airs Ar2 and Ar3 delivered from the second delivery port 712 and the third delivery port 713 into the space S become substantially equivalent. However, the amounts and pressures of the cooling airs Ar2 and Ar3 may be different.

The light source device main body 5A in this embodiment has the arc tube 51 and the reflector 52. However, the light source device main body 5A may be equipped with a so-called sub reflection mirror fixed to the arc tube 51 in such a manner as to cover substantially half of the light emission portion 511 on the front sealing portion 512 side so as to reflect light emitted from the light emission portion 511 toward the front sealing portion 512 such that the light travels toward the reflector 52. This structure can offer advantages similar to those of this embodiment.

While the light source device 5 in this embodiment has the collimating lens 54, the collimating lens 54 may be eliminated.

The arc tube 51 in this embodiment may be selected from various types of discharge-type lamps capable of emitting high-luminance light, such as a metal halide lamp, a high-pressure mercury lamp, and an extra-high pressure mercury lamp.

The optical unit 3 in this embodiment is of a so-called three plate type which includes three light modulation devices (liquid crystal panels 341) corresponding to R light, G light, and B light. However, the optical unit 3 may have a single plate type light modulation device in place of the three plate type. The optical unit 3 may further include a light modulation device capable of improving contrast.

The optical unit 3 in this embodiment includes the transmission type light modulation devices (transmission type liquid crystal panels). However, the optical unit 3 may include reflection type light modulation devices.

The light modulation devices of the optical unit 3 in this embodiment are constituted by the liquid crystal panels 341. However, each of the light modulation devices may be other types of light modulation device as long as they can modulate received light according to image information, such as a micromirror type light modulation device. For example, a DMD (digital micromirror device) is an adaptable micromirror type light modulation device.

According to this embodiment, the illumination device 31 contained in the optical unit 3 as a unit for equalizing the illuminance of the light emitted from the light source device 5 is constituted by a lens integrator system including the lens arrays 311 and 312. However, a rod integrator system including a light guide rod may be employed as the illumination device 31.

What is claimed is:

1. A light source device comprising:
    an arc tube that has a light emission portion for emitting light;
    a reflector that reflects the light toward an illumination receiving area with the arc tube fixed to the reflector; and
    a housing that houses the reflector to form a space through which cooling air for cooling the arc tube flows,
    wherein
        the housing has three delivery ports disposed side by side as ports from each of which the cooling air is delivered toward the direction of the light emission portion,
        a first delivery port included in the three delivery ports is located such that the center of the first delivery port is disposed substantially at a position aligned with the optical axis of the arc tube as viewed in the vertical direction,
        the housing has three channels through which the cooling air flows to each of the three delivery ports,
        second and third channels included in the three channels are disposed in the vicinity of one and the other sides of a first channel, respectively, with respect to the optical axis as viewed in the vertical direction, and
        each of the second and third channels is inclined obliquely toward the direction of the first channel when the three channels are viewed in the vertical direction such that, prior to the cooling air reaching the light emission portion, the cooling air delivered from the first delivery port collides with the cooling airs delivered from the second and third delivery ports within the space between the first delivery port and the light emission portion.

2. The light source device according to claim 1, wherein the second and third channels at which the cooling air is respectively branched into parts flowing through second and third delivery ports are inclined to the first delivery port when the three delivery ports are viewed in the vertical direction.

3. The light source device according to claim 1, wherein the second and third channels are inclined toward the optical axis of the arc tube as viewed in the vertical direction.

4. The light source device according to claim 2, wherein second and third delivery ports are inclined toward the optical axis of the arc tube as viewed in the vertical direction.

5. The light source device according to claim 2, wherein the second and third delivery ports are disposed substantially symmetric with respect to the first delivery port when the three delivery ports are viewed in the vertical direction.

6. The light source device according to claim 1, wherein the three channels are provided such that the position where the cooling airs collide with each other is shifted toward the first delivery port from the middle between the first delivery port and the light emission portion.

7. The light source device according to claim 1, wherein the housing has another set of three channels in addition to the set of the three channels provided on the housing, the two sets of the three channels being disposed substantially symmetric with respect to the horizontal plane passing through the optical axis.

8. A projector comprising:
    the light source device according to claim 1; and
    a light modulation device which modulates light emitted from the light source device according to image information.

9. The projector according to claim 8, wherein the second and third channels at which the cooling air is respectively branched into parts flowing through second and third delivery ports are inclined to the first delivery port when the three delivery ports are viewed in the vertical direction.

10. The projector according to claim 8, wherein the second and third channels are inclined toward the optical axis of the arc tube as viewed in the vertical direction.

11. The projector according to claim 9, wherein second and third delivery ports are inclined toward the optical axis of the arc tube as viewed in the vertical direction.

12. The projector according to claim 9, wherein the second and third delivery ports are disposed substantially symmetric with respect to the first delivery port when the three delivery ports are viewed in the vertical direction.

13. The projector according to claim 8, wherein the three channels are provided such that the position where the cooling airs collide with each other is shifted toward the first delivery port from the middle between the first delivery port and the light emission portion.

14. The projector according to claim 8, wherein the housing has another set of three channels in addition to the set of the three channels provided on the housing, the two sets of the three channels being disposed substantially symmetric with respect to the horizontal plane passing through the optical axis.

15. The light source device according to claim 1, wherein the second and third channels are each inclined with respect to the first channel at substantially the same angle.

\* \* \* \* \*